April 18, 1961    A. J. DIEBOLD    2,979,965
MOTION-TRANSMITTING DEVICE
Filed Aug. 18, 1958
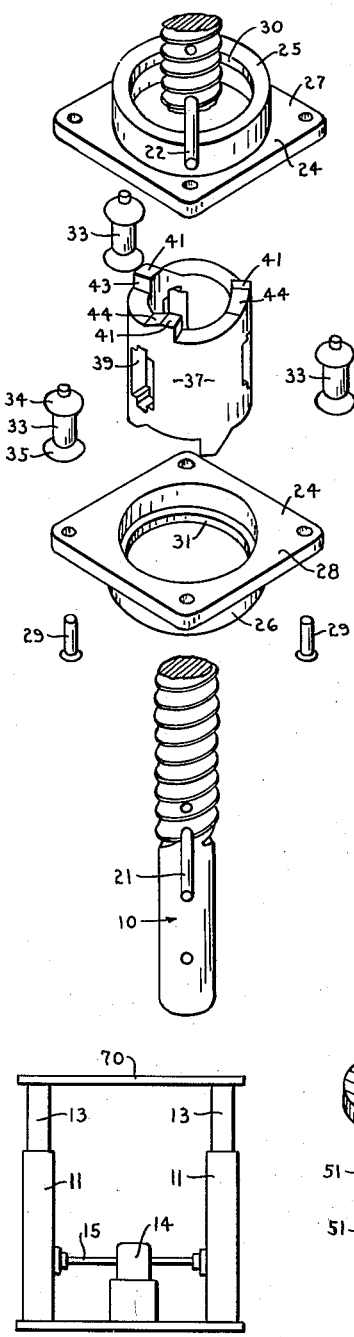
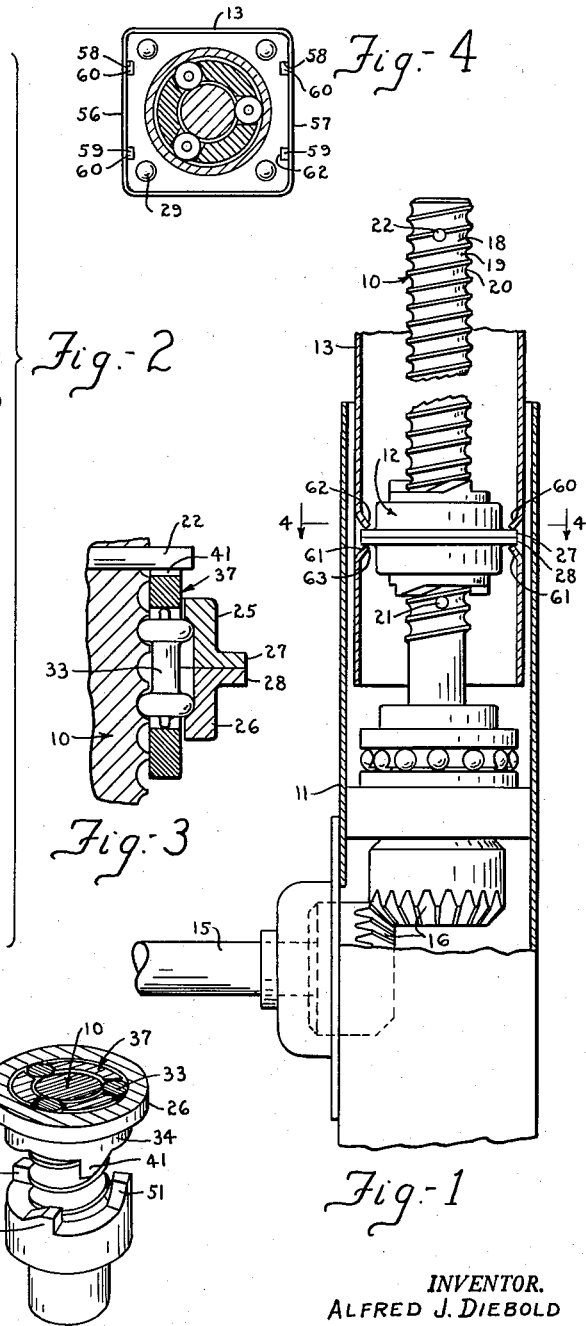
INVENTOR.
ALFRED J. DIEBOLD
BY W. E. Recktenwald
C. S. Penfold
ATTORNEYS United States Patent Office 2,979,965
Patented Apr. 18, 1961

2,979,965

MOTION-TRANSMITTING DEVICE

Alfred J. Diebold, Gary, Ind., assignor to The Anderson Company, a corporation of Indiana Filed Aug. 18, 1958, Ser. No. 755,711

2 Claims. (Cl. 74—424.8)

This invention relates to a motion-transmitting mechanism and more particularly to an improved nut assembly for operative use on a threaded shaft.

Heretofore, a large number of motion-transmitting mechanisms have been devised, some of which have been tested and marketed wherein a nut member is moved along the axis of a threaded shaft member by rotating one of said members whereupon the other of said members is caused to move axially relative thereto. All of these devices have been beset with the problem of creating some means of limiting the axial movement of the nut member relative to the shaft member without damaging either the shaft member or the nut member. Ordinarily, limit switches, clutches or stops are employed to engage the nut member and to limit its axial movement.

If resistance to axial or longitudinal travel of the nut member is applied suddenly, as when the output element or member strikes a stop, the backlash damages the parts of the device and can even break an input element such as a shaft. Even if the external resistance to the motion of the output element is gradually increased, a stalling point is eventually reached at which the resistance overcomes the driving force and the driving element is brought to rest. In those applications where the driving element is the shaft of or connected to the shaft of an electric motor, even a gradual overcoming of the driving force can burn out the motor or inflict other damage. Additionally, when the end of the axial movement is reached as by striking a stop, the output element is often found to bind or otherwise become so impacted on the stop that it is not possible to retract the output element toward its starting point. As an instance, the threaded shaft above referred to may be rotated to move the nut member on the threaded shaft in an axial direction thereof until the nut member strikes a stop. Particularly, if the member rams against the stop in a sudden jarring impact, the nut member may become skewed on the shaft or otherwise bound on the shaft or the stop. When it is subsequently attempted to reverse the motor and rotate the threaded shaft in the opposite direction thereby to retract the nut member, it is often found that the motor lacks sufficient power to withdraw the member.

To avoid some of the problems created by the use of limit switches, clutches or stops, it has been suggested to allow portions of the nut member to rotate freely upon striking a stop on the threaded member, for example, as shown and described in U.S. Patent No. 2,446,393 to Russell. In this cited patent, for example, roller means are interposed between the input and output elements or, more particularly, between a shaft and a nut member so that the shaft may freely rotate with respect to the nut member when the movement of the latter is stopped.

However, in such a construction many disadvantages have manifested themselves. For instance, with only one stop face on the carrier element of the nut, a serious indexing problem is presented in assembly. That is, the stop member has to be positioned relative to the thread and to the stop face on the carrier in a precise manner otherwise the two will not contact in the desired manner with the result that two will join the same as in the older prior art. Under certain conditions the pin will strike the carrier on one side only, canting the carrier off axis and causing the nut to bind.

The present device obviates all of the foregoing faults. In my device the driving and driven elements are designed to rotate with respect to each other when the motion of the driven element is externally interrupted and thereby avoid shocks and backlash to the input or driving element. In the present invention, a plurality of stop faces are provided on the carrier in such a way that one face positively fully engages the stop pin for freewheeling. In a modified form of the invention, canting of the carrier is prevented by a positive planar contact between the carrier and stop member. An additional feature relates to an improved and simplified means for staking the nut member in a housing.

It is, therefore, a principal object of this invention to overcome the above-noted disadvantages of the prior art and to provide an improved nut-and-screw arrangement having improved freewheeling characteristics.

It is another important object of this invention to provide an improved nut-and-screw arrangement having stop means for creating a positive freewheeling action between the nut and the screw.

It is a further object of this invention to provide a stop means for a threaded shaft member that can be axially adjusted to any position along the shaft without in any way damaging the shaft.

It is a still further object of this invention to provide an improved abutting surface on a portion of the nut member which is positioned in predetermined oriented relationship with respect to a bearing opening in said portion so that positive freewheeling action is produced between the nut member and a screw member when said surface contacts a stop on the screw.

And a still further object of this invention is to provide an improved freewheeling nut device which, when used in pairs on spaced shafts, will be self-leveling with respect to each other at each end of the stroke of the nuts on the shafts.

And yet another object of this invention is to provide an improved nut member wherein the bearing elements are positioned relative to an abutting surface on the carrier in such a way that predetermined freewheeling contact will be made with a stop pin during each cycle of operation.

These and other objects of my invention will appear from time to time as the following specification proceeds and with reference to the accompanying drawings wherein:

Figure 1 is a side elevation view partially in section of a nut-and-screw arrangement embodying the features of my invention.

Figure 2 is an exploded perspective view of the important parts of the nut-and-screw arrangement of Figure 1.

Figure 3 is a partial sectional view taken through the nut and screw showing a freewheeling stop on the nut in engagement with a freewheeling stop on the screw.

Figure 4 is a cross-sectional view taken along the line 4—4 in Figure 1.

Figure 5 is a perspective view of a modified form of freewheeling stops.

Figure 6 is a simplified assembly view of two nut-and-screw arrangements of Figure 1 in combination for raising and lowering a substantially level platform.

The invention as mentioned above may be utilized wherever applicable, but as illustrated in the drawings is operatively associated with the raising and lowering of a substantially level platform such as shown in Figure 6.

Referring particularly to Figures 1 and 6 of the drawings, showing among other things, a screw or threaded shaft member 10 vertically supported for rotation in a fixed housing 11, a nut assembly generally designated 12 carried by the screw 10, and an axially movable output member 13 staked to the nut assembly 12. A reversibly rotatable power unit 14 drives the shaft 15 which in turn rotates the threaded shaft member 10 through a pair of meshed bevel gears 16. Rotation of the shaft 15 in either a clockwise or counterclockwise direction will drive the screw member in the appropriate direction for raising or lowering the output member 13 through the nut member 12.

The screw 10 shown in the drawing is of the multiple-thread type. More particularly, it includes triple, right-hand threads 17, 18 and 19 which are produced by any one of the well-known methods, such as by means of rollers or the like. Obviously, there may be any desired number of threads on the screw 10 which threads may be right-handed or left-handed without departing from the spirit of the invention. A pair of pins or stop members 21 and 22 are mounted on the screw member 10 near the opposite ends of the threaded portion of the screw member for a purpose to be described hereinafter.

The shafts 10 and 15 are mounted for rotation relative to the housing 11 in any well-known manner such as by the use of sleeve-type bearings, roller bearings or the like. The details of the bearings for supporting the shafts form no part of this disclosure.

The nut member 12 encircles a portion of the threaded shaft 10 for relative rotational and longitudinal movement. The nut member comprises an enclosure or mounting means 24 defined by a pair of flanged tubes or collars 25 and 26 which have abutting square-shaped flange portions 27 and 28, respectively, at adjacent ends. Rivets 29 secure the corners of the flange portions together. The free ends of the collars are of reduced diameter or turned inwardly to form shoulders or raceway surfaces 30 and 31 within the collars 25, 26, respectively. The shoulders are substantially radially disposed with respect to the shaft 10. Each of the collars 25 and 26 is similar to the other and may be easily formed by means of a stamping operation.

Rotatable bearing elements are interposed between the mounting means 24 and the shaft 10 to adapt these members for relative rotational and longitudinal movement and to transfer or transmit a load or force from the mounting means to the shaft or vice versa. Preferably, elongate bearing elements 33 are used and are disposed axially of the mounting means and shaft to stabilize these parts relatively to each other. Each element 33 has radially enlarged bearing surfaces 34, 35 which serve a dual function. These surfaces are spaced axially on each rotatable element 33 a distance substantially equal to the axial distance between the raceway surfaces 30 and 31, so that the elements 33 neatly nest within the area of largest diameter of the mounting means. Since the raceway surfaces 30, 31 each lie in a plane substantially perpendicular to the longitudinal axis of the shaft 10, the radially enlarged surfaces 34, 35 thrust-engage said raceways in an axial direction to limit relative axial movement between the mounting means 24 and the rotatable elements 33 with respect to the shaft 10. Additionally, the radially enlarged surfaces 34, 35 engage a thread of the shaft 10 at spaced-apart points as shown in Figure 3 and, more particularly, make a rolling engagement with a side of the thread to effect the relative rotational and longitudinal movement between the nut assembly 12 and the shaft 10.

A tubular cage member or carrier 37 fits between the mounting means 24 and shaft 10 and has equally spaced-apart openings 39 to house the rotatable elements 33 and thereby retain them in a spaced relation about the periphery of shaft 10. The cage member also maintains the longitudinal axes of the rotatable elements and the shaft in a desired relation, usually a substantially parallel relation. The openings 39 are of a size to rotatably receive the elements 33 and, as shown in Figure 2, may be of a general cruciform shape. The outside diameter of the cage member 37 is slightly less than the inside diameters of the collars 25 and 26 at their inwardly turned ends, so that the cage member 37 makes a sliding fit with the collars at these points to provide a substantially rattle-free assembly.

In the preferred form, the radially enlarged bearing surfaces 34, 35 have an outer exterior of generally toroidal shape. A toroidal bearing surface is preferred since it has been found to provide a highly desirable substantially point-to-point engagement with a thread of a shaft.

In the embodiment illustrated, the cage member 37 has openings to accommodate three rotatable elements 33, although more or less of these openings and elements may be employed. In the same manner, shaft 10 is multithreaded and specifically contains three distinct threads. The bearing surfaces 34, 35 of each element 33 follow a different thread so that all of the surfaces 34 lie in one common plane with the surfaces 35 in a different common plane. One feature of the present structure is that one bearing element may be provided for each thread thus permitting the enlarged bearing surfaces to be aligned and to transfer their lead to a common abutting surface such as 30 and 31 formed in the collars 25 and 26, respectively. Thus, the collars may be formed easily and by relatively inexpensive metal stamping operation or the like. A greater or smaller number of threads and corresponding bearing elements may be used in any given structure. Fewer elements may be used while still retaining sufficient stability and obviously more threads and elements will provide greater stability and greater load-carrying capacities.

In the illustrated form, the cage member 37 has three contacting surfaces or stop lugs 41 extending in an axial direction from each longitudinal end thereof. The number of stop lugs will be equal to the number of openings 39 in the cage member 37. Each lug 41 will have a contact face 43 which will be located in a preset angular relationship with respect to one particular opening 39. The axial height of each stop lug 41 and the angular shape of its back surface 44 is controlled by the lead of the threads on the shaft 10. It is necessary to control the height and back surface so that the stop pins 21, 22 can just clear one stop lug 41 and make a full positive contact with the next lug 41.

With each stop lug 41 positioned with respect to one opening 39, no problem exists in assembling the device as far as having a stop 41 properly oriented to contact the pins 21, 22. That is, with a pin 21 or 22 positioned through the shaft 10 in the root of the thread, one of the stop lugs 41 will fully engage the pin every time the nut returns to that end of the stroke. Under prior teachings, using only one stop lug on a carrier it was necessary to assemble and reassemble the nut on the shaft repeatedly until the carrier was properly oriented so that the lug would contact the pin. Without proper orientation, the pin would strike the axial end surface of the carrier and bind the nut into locked condition. As an alternate method, under the prior teachings, the nut was assembled with the shaft and the stop pin placed in the properly contacting position. This had the serious disadvantage of limiting the length of the stroke of the nut to some value not necessarily the desired length of stroke.

Figure 5 shows a modified form of my invention wherein stop collar 50 is shown locked to the screw 10 in any well-known manner such as by set screws, lock nuts, etc. The longitudinal end portion of the stop 50 has three stop lugs 51 axially projecting in the direction of the nut member 12. The lugs 51 are equally spaced apart, are shaped and of a size substantially identical with the stop lugs 41 on the carrier 37. Each lug 41 on the carrier is adapted to fully engage a lug 51 on the stop collar 50 so that the stopping forces are equally distributed to the stop collar at three points. In this way the carrier 37 is not likely to cant or tilt off axis and jam. The stop collar 50 is for use with extreme loads that would normally create problems for the single stop pin 21, 22.

It is to be understood that although three lugs 41, three stops 51 and three threads are shown and described, the invention is not to be limited to such numbers. The invention is equally operative with four lugs, four stops and four threads, etc.

In operation, when the nut 12 reaches the lower portion of its travel, one lug 41 on the carrier 37 will engage the pin 21, or collar 50, so that even though the screw 10 continues to turn the carrier will turn with it and both carrier and screw will rotate relative to the nut housing 24 which will not move. As a result, the output member 13 will not move until the motor is reversed whereupon the nut will be released from the stop and will drive the output member 13 upwardly.

The nut member 12 is shown square in shape and is secured in the shaped housing 13 by means of staking, best shown in Figures 1 and 4. The staking is formed in the opposite, spaced-apart walls 56, 57 of the housing 13. The staking in each wall 56 or 57 comprises two spaced-apart opposed pairs 58, 59 of narrow tabs 60, 61. Each tab 60, 61 is bent inwardly so that the inner free ends 62, 63, respectively, are spaced apart a distance substantially equal to the thickness of the joined flanges 27, 28. The staking can be performed in any well-known manner and since each of the opposite sides 56, 57 have two spaced pairs 58, 59 of stakes, the member 13 will have to be turned only once during forming of the staking. That is, one pair of stakes can be formed in one wall, i.e. 56, whereupon the member 13 is turned over so that the second pair of stakes can be formed in side 57. This is a considerable saving over the method of applying only one pair of stakes in each of the four sides which required turning the member four times with the added possibility of applying one or more pairs of stakes out of the plane of the other stakes with the resultant impossible assembly operation with respect to the nut.

With the two pairs of stakes formed in the member 13, it is a simple process to insert a screw 10 with a nut 12 assembled thereon into the member 13 until the edges of the nut engage one-half 60 or 61 of each pair of tabs 58, 59. Further pressure on the nut will depress the contacted tabs until the flanges 25, 26 snap into the space between the ends 62, 63 of the tabs. The tabs will then bite into the opposite faces of the flanges to hold the nut in position in the member 13. The shape of the member 13 and nut 12 will prevent the nut from turning about the axis of the shaft. As the shaft 10 turns the nut will move along the shaft and will drive the output member 13 in the same direction.

Figure 6 illustrates the use of two of the screws 10 and nuts 12 to raise and lower a platform 70. The output members 13 are connected to the nuts and to the platform so that rotation of the shafts 15 by the motor 14 will raise the platform in a substantially level manner. Due to the freewheeling characteristics of the nuts 12, the platform is always maintained in a substantially level condition. That is, in the event the load on the platform is uneven or in the event one of the nuts moves faster than the other, the platform will be canted out of level. Since the nuts 12 are able to freewheel, the first nut reaching its stop 22 will start to freewheel until the other nut reaches its stop 22 whereupon the platform is once again level. In this way, the platform is adjusted to a level condition at each end of the path of movement of the platform.

Having thus described my invention, it is obvious that various other modifications may be made in the same without departing from the spirit of my invention; hence, I do not wish to be understood as limiting myself to the exact forms, constructions, arrangements and combinations of parts herein shown and described or uses mentioned.

I claim:

1. A motion-transmitting device comprising a screw having at least three helical grooves in the peripheral surface thereof, a nut having a bore therein receiving said screw, said nut having a plurality of axially spaced circumferential annular raceways formed in the bore thereof, bearing members, each having at least two spaced-apart bearing surfaces simultaneously seating in certain of said grooves of said screw and engaging one of said raceways of the nut, a tubular cage between said screw and nut and having openings therein receiving and maintaining said bearing members in predetermined relation with respect to each other, said cage having integral with an end thereof a number of abutment elements equal to the number of grooves in said screw, said abutment elements being equally spaced and of generally saw-tooth configuration and extending axially of the cage, and a collar sleeved upon and fixed to said screw, said collar having formed thereon a like number of stop means facing said abutment elements of said cage, said stop means being disposed in reverse arrangement to and being of a shape and spacing corresponding to said abutment elements on said cage for simultaneous mating engagement therewith.

2. A motion-transmitting device comprising a screw having at least three helical grooves in the peripheral surface thereof, a nut receiving said screw, bearing elements between said screw and nut, a tubular cage between said screw and nut and having openings therein receiving and maintaining said bearing members in predetermined relation with respect to each other, said cage carrying at one end thereof a number of abutment elements equal to the number of grooves in said screw member, said abutment elements being equally spaced and extending axially of the cage, and a collar sleeved upon and fixed to said screw, said collar carrying a like number of stop means facing said abutment elements, said stop means being spaced corresponding to said abutment elements for simultaneous mating engagement therewith.

References Cited in the file of this patent

UNITED STATES PATENTS

| | | |
|---|---|---|
| 1,105,590 | Abbott | July 28, 1914 |
| 2,353,446 | Heintz | July 11, 1944 |
| 2,446,393 | Russell | Aug. 3, 1948 |
| 2,623,406 | Hansen | Dec. 30, 1952 |
| 2,714,005 | Wise | Sept. 28, 1953 |
| 2,739,491 | Russell | Mar. 27, 1956 |
| 2,757,548 | Smith et al. | Aug. 7, 1956 |
| 2,778,239 | Hoover | Jan. 22, 1957 |
| 2,832,130 | Harvey | Apr. 29, 1958 |
| 2,844,969 | Lohr | July 29, 1958 |

OTHER REFERENCES

"Introduction to Toton," The Anderson Co., Copyright 1956.

UNITED STATES PATENT OFFICE
CERTIFICATE OF CORRECTION

Patent No. 2,979,965　　　　　　　　　　　　　　　April 18, 196

Alfred J. Diebold

It is hereby certified that error appears in the above numbered patent requiring correction and that the said Letters Patent should read as corrected below.

Column 1, line 25, for "of", first occurrence, read -- for --; line 43, for "reached" read -- limited --; column 2, line 53, for "elevation" read -- elevational --; column 4, line 43, for "controlled by" read -- based upon --; line 44, for "control" read -- select --; line 62, after "pin" insert -- then --; same column 4, line 67, before "stop" insert -- a -- column 5, line 48, for "bite" read -- bight --; column 6, line 54, for "2,353,446" read -- 2,353,466 --; line 65, for "Toton" read -- Roton --.

Signed and sealed this 12th day of December 1961.

(SEAL)
Attest:

ERNEST W. SWIDER　　　　　　　　　　　　　　　DAVID L. LADD
Attesting Officer　　　　　　　　　　　　　Commissioner of patents